United States Patent Office 2,964,496
Patented Dec. 13, 1960

2,964,496

STABILIZED POLY-α-OLEFIN COMPOSITIONS

Gordon C. Newland and John W. Tamblyn, Kingsport, Tenn., assignors to Eastman Kodak Company, Rochester, N.Y., a corporation of New Jersey No Drawing. Filed June 15, 1959, Ser. No. 820,136

6 Claims. (Cl. 260—45.75)

This invention relates to the stabilization of poly-α-olefin compositions. Preferred embodiments of the invention relate to the stabilization of polyethylene and polypropylene compositions against deterioration resulting from exposure to sunlight or ultraviolet light with a novel synergistic stabilizer combination.

Poly-α-olefins such as polyethylene, polypropylene and the like are subject to photo-oxidation when exposed to sunlight. This oxidation is characterized in its earlier stages by the breaking of the polymer chain and the formation of carbonyl groups. As the oxidation continues, the polymer cracks and loses tensile strength to the point of mechanical failure. A number of so-called ultraviolet inhibitors are known which inhibit the photodegradation of many polymers, resins or plastics. However, many effective stabilizers for halogen-containing polymers, for example, such as polyvinyl chloride, polyvinylidene chloride and the like are not effective stabilizers in poly-α-olefins as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins because of the inherently different nature of poly-α-olefins. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. We know of no method whereby a combination of stabilizers can be predicted to be synergistic stabilizers for poly-α-olefin compositions short of actually testing the combination, even though the individual components comprising the combination may be well-known stabilizers for various polymers, resins or plastics, including poly-α-olefin compositions.

Apart from the fact that it is an unexpected scientific discovery when two stabilizers are found that will synergize with each other in poly-α-olefin compositions, there are certain practical advantages that often times accompany the use of such a combination of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it would be desirable to be able to substitute the cheaper stabilizer for a portion of the more expensive stabilizer, and still be able to obtain good stabilization through the synergism of the stabilizer combination. Thus, it is highly desirable in the poly-α-olefin art to have available synergistic combinations of two or more materials.

It is an object of this invention to provide a new synergistic combination for stabilizing poly-α-olefin compositions.

It is another object of this invention to provide novel polyethylene and polypropylene compositions containing synergistic combinations of compounds that improve the stability of the polyethylene and polypropylene compositions against deterioration resulting from exposure to sunlight or ultraviolet light.

Other objects of the invention will be apparent from the description and claims that follow.

The present invention comprises poly-α-olefin compositions having incorporated therein a stabilizing amount of a combination of powdered lead chromate and 2,2'-methylenebis(6-tertiary-butyl-p-cresol).

The lead chromate ($PbCrO_4$) component of the present combination is in powder form, usually in particles less than about 500 millimicrons and preferably in particles 100 to 400 millimicrons in diameter.

The 2,2'-methylenebis(6 - tertiary - butyl - p - cresol) component of the subject combination is a well-known material having the formula

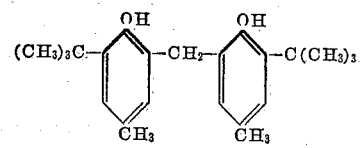

When combined with 2,2' - methylenebis(6 - tertiary-butyl-p-cresol) the described lead chromate produces a stabilizing effect against ultraviolet deterioration in poly-α-olefins that is greater than the additive or aggregative stabilizing effect of these individual stabilizers. Such combinations are generally referred to as "synergistic" combinations.

The combination of 2,2'-methylenebis(6-tertiary-butyl-p-cresol) and lead chromate can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polyethylene and polypropylene, and particularly polyethylene, although such poly-α-olefins as poly 4-methylpentene-1, poly 3-methylbutene-1, poly 3,3-dimethyl-butene-1, poly pentene-1, poly decene-1 and the like are included in the invention. Both the so-called "low density" and "high density" poly-α-olefin compositions can be stabilized in accordance with the invention. "Low density" polyethylenes usually have densities of .91 to .93, and "high density" polyethylenes usually have densities of .94 to .97. A typical "low density" polypropylene has a density of .85 and a typical "high density" polypropylene has a density of .92. The densities of other poly-α-olefins are known in the art. Reference is made to Fawcett et al. U.S. Patent No. 2,153,553 granted April 11, 1939, and to applications Coover U.S. Serial No. 559,536 filed January 17, 1956 and Coover et al. U.S. Serial No. 724,904 filed March 31, 1958, with regard to the preparation of various poly-α-olefin compositions that can be stabilized against ultraviolet deterioration with the subject stabilizer combination. The subject stabilizer combination can be used as an ultraviolet inhibitor for the more common solid resinous poly-α-olefin compositions having average molecular weights of at least 15,000 and more usually at least 20,000, as well as the so-called poly- α-olefin waxes having lower molecular weights, usually 3,000–12,000.

The amount of the combination of the subject 2,2'-methylenebis(6-tertiary-butyl-p-cresol) and lead chromate employed in poly-α-olefin compositions in accordance with the invention can be widely varied, the stabilizing amount of this combination usually varying with the particular use to which the poly-α-olefin is to be put. Concentrations of the combination of at least .001% are generally used, and concentrations of .1% to 10% are preferably used, the concentration being based on the weight of the poly-α-olefin. The weight ratios of the stabilizers comprising the subject synergistic combination likewise can be varied. We prefer to utilize the combination of the subject stabilizers at weight ratios of 2,2'-methylenebis(6-tertiary-butyl-p-cresol) to lead chromate ranging from 1/30 to 30/1, with ratios of 1/30 to 1/1 utilizing higher proportions of lead chromate being preferred.

The stabilizer combination of the invention can be incorporated or blended into poly-α-olefin compositions by conventional methods used for blending such materials into resins or plastics. Typical of such methods that can be suitably employed include milling on heated rolls and dry-blending. The stabilizers of the invention can be incorporated separately or together into the poly-α-olefin composition.

The stabilizer combination of the present invention lends to poly-α-olefin compositions improved stability, and more specifically, improved stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefins stabilized in accordance with the invention can be cast, extruded, rolled or molded into sheets, rods, tubes, piping, filaments and other shaped articles, including the widely used films of the polymer about .5 to 100 mils in thickness. The present compositions can be used for coating paper, wire, metal foil, glass fiber fabrics, synthetic and natural textiles and other such materials. Likewise, small amounts of other additives such as other polymers, resins or plastics, as well as other stabilizers or inhibitors, that are commonly added to poly-α-olefins for specific uses are not deleterious to the effectiveness of the present synergistic combination.

The invention is illustrated by the following examples of preferred embodiments thereof.

*Example 1*

Into several portions of polyethylene having an average molecular weight of about 30,000 and a density of .918 was hot-roll compounded 5% by weight of powdered lead chromate (PbCrO$_4$, chrome yellow) having a particle size of 300 millimicrons plus .5% by weight of 2,2'-methylenebis(6-tertiary-p-cresol), as well as these two materials individually and a control containing no additive. For comparative purposes, portions of the polyethylene were prepared containing 5% by weight of powdered rutile having a particle size of 300 millimicrons ("Titanox RA-10," Titanium Pigment Corp.) plus .5% by weight of 2,2'-methylenebis(6-tertiary-butyl - p - cresol), as well as the rutile alone. The resulting polyethylene compositions were thereafter compression-molded into sheets 125 mils in thickness, 10 samples 1.5 x .5 inch in size diced out of the compression molded sheets for each polyethylene composition, the resulting samples bent into a U-shape and then exposed to outdoor weathering at Kingsport, Tennessee. The stressed portion of each sample was mounted facing south. The exposure times in days required to start cracks in half of the samples (5 samples for each polyethylene composition) are summarized below in Table A. In Table B below is summarized the appearance of the respective samples after an exposure of 2 years.

*Table A*

| Additive | Stress-Cracking Resistance. Exposure Time (Days) Required to Start Cracks in Half of the Samples |
| --- | --- |
| (1) None | 170 |
| (2) 5% Lead Chromate | 350 |
| (3) .5% 2,2'-Methylenebis(6-tert.-butyl-p-cresol) | 370 |
| (4) 5% Rutile | 390 |
| (5) 5% Rutile+.5% 2,2'-Methylenebis(6-tert.-butyl-p-cresol) | 380 |
| (6) 5% Lead Chromate+.5% 2,2'-Methylenebis(6-tert.-butyl-p-cresol) | >1,450 |

*Table B*

| Additive | Appearance After 2 Years of Exposure |
| --- | --- |
| (1) None | Broken at end of first year. |
| (2) 5% Lead Chromate | Fine cracks, dull surface. |
| (3) .5% 2,2'-Methylenebis(6-tert.-butyl-p-cresol) | Broken. |
| (4) 5% Rutile | Deep, wide cracks, dull surface. |
| (5) 5% Rutile+.5% 2,2'-Methylenebis(6-tert.-butyl-p-cresol) | Fine cracks, shiny surface. |
| (6) 5% Lead Chromate+.5% 2,2'-Methylenebis(6-tert.-butyl-p-cresol) | Shiny, uncracked surface. |

As can be observed from the comparisons set out in the above tables, particularly the quantitative comparative data set out in Table A, the combination of lead chromate and 2,2'-methylenebis(6-tertiary-butyl-p-cresol) has a stabilizing effect in polyethylene that is substantially greater than the additive effective of the individual components of this combination. Rutile, which is essentially titanium dioxide and is a conventional pigment material, does not synergize like lead chromate with 2,2'-methylenebis(6-tertiary-butyl-p-cresol) in the subject poly-α-olefin composition.

*Example 2*

A .5% by weight portion of 2,2'-methylenebis(6-tertiary-butyl-p-cresol) in combination with a 5% by weight portion of powdered lead chromate as described in Example 1 incorporated into polypropylene having an average molecular weight of 110,000 and a density of .917, when prepared in test samples and exposed to weathering as described in Example 1, show a synergistic effect in stabilizing the polypropylene against deterioration resulting from the exposure.

The present invention thus provides novel poly-α-olefin compositions having improved stability against deterioration resulting from exposure to ultraviolet light, and particularly it provides novel and useful synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:

1. A solid poly-α-olefin composition comprising a poly-α-olefin prepared from an α-monoolefinic aliphatic hydrocarbon having 2 to 3 carbon atoms containing at least .001% by weight based on said poly-α-olefin of a stabilizer combination comprising 2,2'-methylenebis(6-tertiary-butyl-p-cresol) and powdered lead chromate.

2. A solid poly-α-olefin composition comprising a poly-α-olefin selected from the group consisting of polyethylene and polypropylene containing .1% to 10% by weight based on said poly-α-olefin of a stabilizer combination comprising 2,2' - methylenebis(6-tertiary-butyl-p-cresol) and powdered lead chromate, the weight ratio of said 2,2'-methylenebis(6-tertiary-butyl-p-cresol) to said lead chromate being in the range of 1/30 to 30/1.

3. A solid poly-α-olefin composition comprising polyethylene containing .1% to 10% by weight based on said polyethylene of a stabilizer combination comprising 2,2'-methylenebis(6-tertiary-butyl-p-cresol) and lead chromate in the form of particles 100 to 400 millimicrons in size, the weight ratio of said 2,2'-methylenebis(6-tertiary-butyl-p-cresol) to said lead chromate being in the range of 1/30 to 1/1.

4. A solid poly-α-olefin composition comprising polypropylene containing .1% to 10% by weight based on said polypropylene of a stabilizer combination comprising 2,2'-methylenebis(6-tertiary-butyl-p-cresol) and lead chromate in the form of particles 100 to 400 millimicrons in size, the weight ratio of said 2,2'-methylenebis(6-tertiary-butyl-p-cresol) to said lead chromate being in the range of 1/30 to 1/1.

5. A solid poly-α-olefin composition comprising polyethylene having an average molecular weight of at least 15,000 containing about .5% by weight based on said polyethylene of 2,2'-methylenebis(6-tertiary-butyl-p-cresol) and about 5% by weight based on said polyethylene of lead chromate in the form of particles about 300 millimicrons in size.

6. A solid poly-α-olefin composition comprising polypropylene having an average molecular weight of at least 15,000 containing about .5% by weight based on said polypropylene of 2,2'-methylenebis(6-tertiary-butyl-p-cresol) and about 5% by weight based on said polypropylene of lead chromate in the form of particles about 300 millimicrons in size.

References Cited in the file of this patent

UNITED STATES PATENTS

| | | |
|---|---|---|
| 2,675,366 | Pullman | Apr. 13, 1954 |
| 2,820,775 | Chamberlain et al. | Jan. 31, 1958 |
| 2,829,121 | Leeper | Apr. 1, 1958 |

FOREIGN PATENTS

| | | |
|---|---|---|
| 744,875 | Great Britain | Feb. 15, 1956 |
| 797,344 | Great Britain | July 2, 1958 |